UNITED STATES PATENT OFFICE.

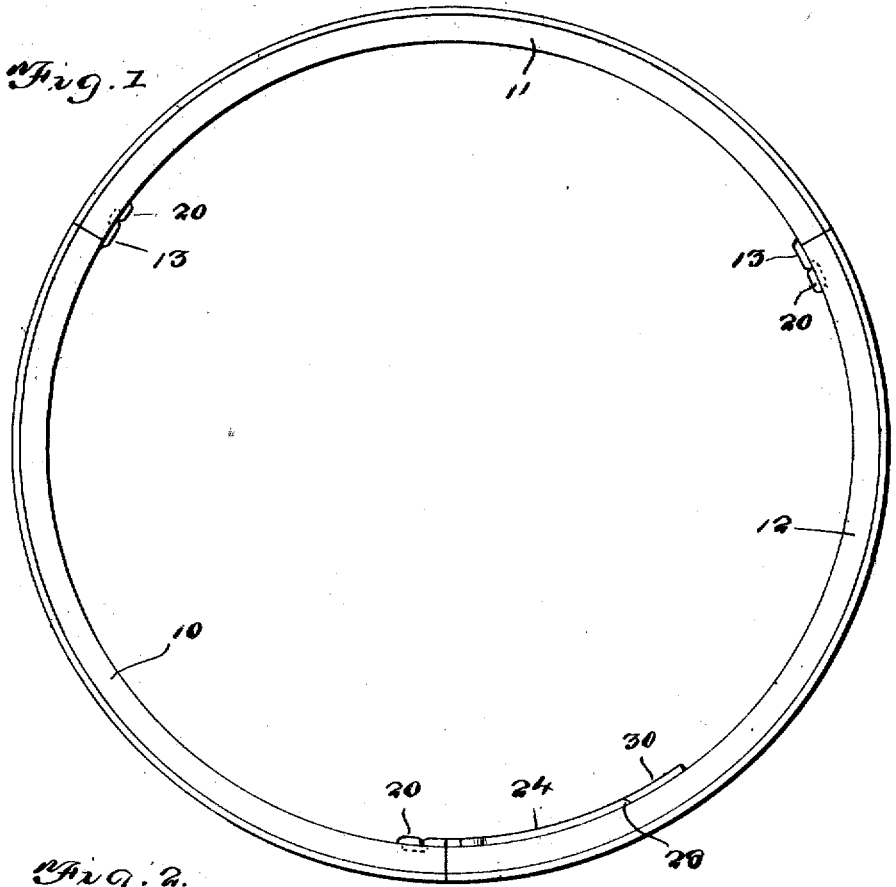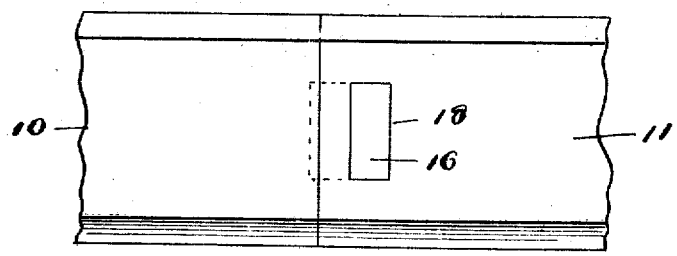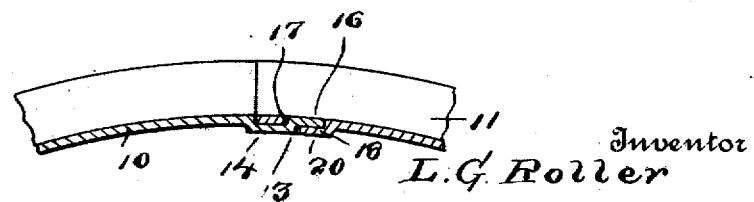

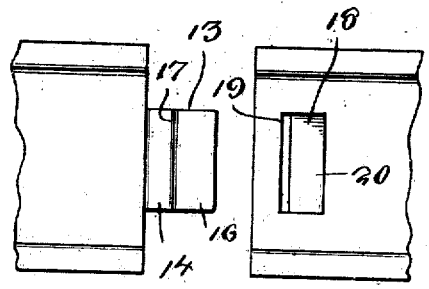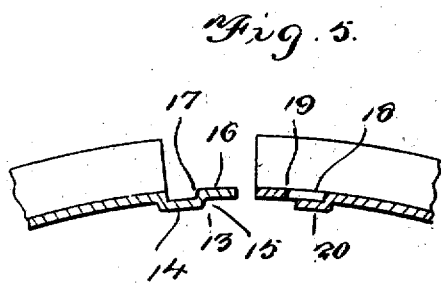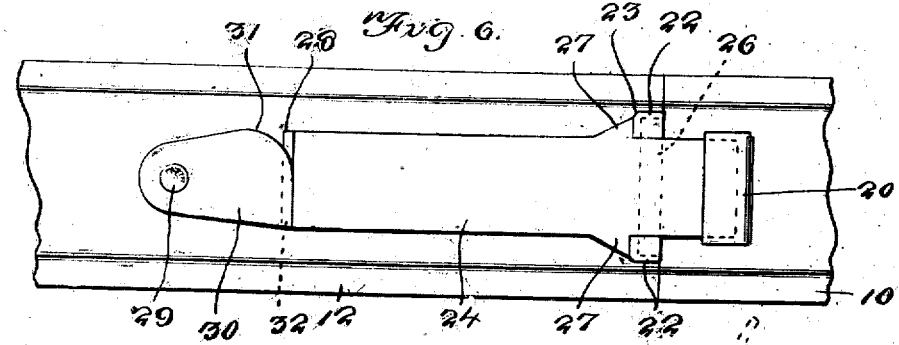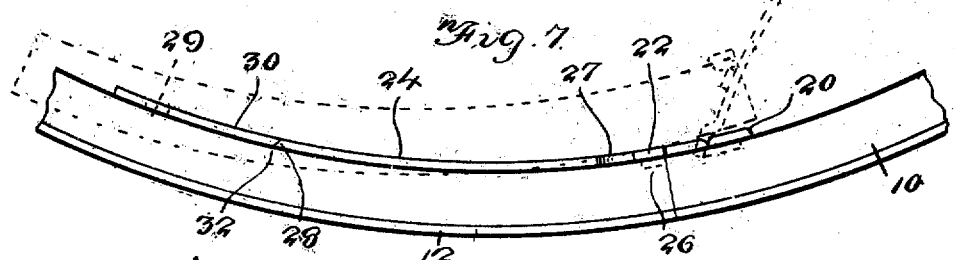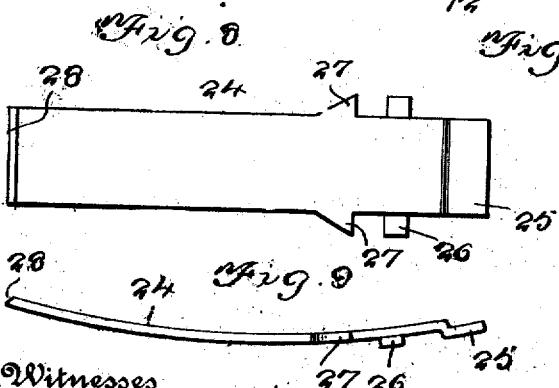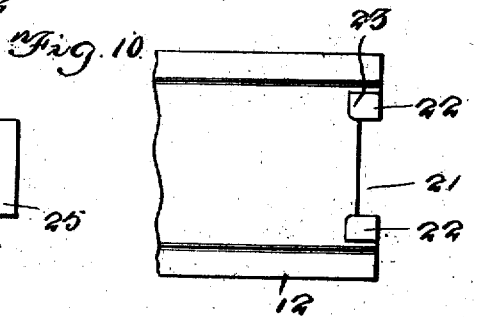

LESLIE G. ROLLER, OF HUMESTON, IOWA.

RIM.

1,317,105.  Specification of Letters Patent.  Patented Sept. 23, 1919.

Application filed June 6, 1919. Serial No. 302,147.

*To all whom it may concern:*

Be it known that I, LESLIE G. ROLLER, a citizen of the United States, residing at Humeston, in the county of Wayne and State of Iowa, have invented new and useful Improvements in Rims, of which the following is a specification.

This invention has reference to a rim for pneumatic tires.

An object of the invention is to produce a demountable rim constructed of interengaging sections which may be attached to or detached from a tire without the employment of tools.

A further object of the invention is to produce a collapsible rim comprising only few parts so that the same can be manufactured comparatively cheap, and one in which when the sections are connected will produce a strong and efficient structure.

A further object of the invention is to produce a sectional rim for pneumatic tires having means providing a lock between two of the sections for expanding or contracting the said sections when the rim is to be attached to or removed from a tire.

It is a still further object of the invention to produce a sectional rim for pneumatic tires in which the sections thereof, when disconnected may be nested one over the other to produce a small package for storage or shipment.

Other objects and advantages will present themselves as the nature of the invention is better understood, reference being had to the accompanying drawings in which there is illustrated a simple and satisfactory reduction of the improvement to practice, and in which:

Figure 1 is a side elevation of a rim constructed in accordance with this invention.

Fig. 2 is a detail plan view thereof at the meeting ends of two of the sections.

Fig. 3 is a sectional view approximately on the line 3—3 of Fig. 2.

Fig. 4 is a plan view showing the sections illustrated in Figs. 2 and 3 slightly spread apart.

Fig. 5 is a side elevation of the device illustrated in Fig. 4.

Fig. 6 is a plan view of the sections provided with the locking means.

Fig. 7 is a side elevation, parts being broken away and parts being in section of the construction illustrated in Fig. 6, the dotted lines indicating the manner in which the lever is employed for expanding or contracting the rim sections.

Fig. 8 is a plan view of the lever.

Fig. 9 is an edge view thereof.

Fig. 10 is a detail plan view of the section to which the locking device is designed to be removably secured.

My improved rim is constructed of three similar segmental sections indicated for distinction by the numerals 10, 11 and 12. Each of the sections has its edges flanged in the usual manner and the sections 10 and 12 at their ends meeting the ends of the section 11 are connected to the said section by hook and socket devices as illustrated by the drawings. On the under face of the sections 10 and 11, at the end of the section 10 disposed to contact with the section 11 and on the end of the section 11 designed to contact with the end of the section 12 is a hook 13. These hooks are of a thickness corresponding to the thickness of the sections constituting the rim and provide each a straight body portion 14 formed at its outer end with an upset portion 15 from which extends a beak 16. The shoulder between the beak 16 and the outer face of the body 14 is arranged angularly as indicated by the numeral 17. The sockets designed to receive the hooks include each a substantially rectangular slot 18 of a size to snugly receive the beak of the respective hooks. The outer walls of the slots 18 are arranged at an inclination as indicated by the numerals 19 to engage with the angle shoulders 17 of the hooks. The slots 18 have their rear portions closed by bars 20 that are secured transversely on the under faces of the rim sections, and on these bars rest the lower faces of the beak portions of the hooks, the shoulders 15 contacting with the outer edges of the said bars. The bars 20 are of a thickness equaling the thickness of the rim sections on which they are formed or to which they are secured.

The section 10, at its end confronting the end of the section 12 is provided with a socket similarly formed to that above described. The rim section 10, upon its inner face, and adjacent to its end designed to contact with the end of the section 12 is provided with a central notch 21, and upon its inner face, to the opposite ends of the notch with outstanding lugs 22, the inner ends of the said lugs being beveled as at 23.

The locking device is in the nature of a lever and is broadly indicated by the numeral 24. The lever 24 is rounded upon itself to conform to the circumferential contour of the section 10 and is provided on one of its ends with a hook 25, and inward of the hook with a transverse bar 26 that extends beyond the edges of the lever. This bar is secured upon the inner or under face of the lever, and the said lever, inward of the bar has its edges outturned to provide lugs 27 disposed parallel with the bar. The hook 25 is designed to be received in the socket on the section 10, and the bar 26 in the notch at the end of the section 12. The lugs 27 engage with the lugs 21 at the end of the section 12. The end of the lever opposite that provided with the hook is beveled or arranged at an inclination as indicated by the numeral 28. Pivoted to the inner face of the section 10, as at 29 is a latch 30. One of the corners of this latch is rounded as at 31 and the outer and active face of the said latch is undercut or beveled as at 32. This beveled portion is designed to co-engage with the inclined or beveled end 28 of the lever 24.

In manufacture the sections of the rim and the tongue and sockets thereof are stamped or pressed each from one piece of stock and when connected provide what may be termed a one-way hinge joint. The lever is drop forged as may be the catch. The catch is in the nature of a turn button and the pivot therefor is the only rivet employed in the construction.

The lever when in locking position, by its inter-engagement with the elements provided upon the meeting ends of the sections 10 and 12 holds the rim against expansion beyond normal size.

When the rim is to be taken from the tire the latch 30 is turned to release the lever 24. The lever is lifted and is fulcrumed in the socket 18 of the section 10, and the bar 26 is pressed over the elements 22 and pressed thereagainst so that a swinging of the lever will bring the section 12 up and out of position as well as over the end of the section 10, thus collapsing the rim. To attach the rim to a tire the same is simply put against the inner face of the tire and the lever brought to locking position. The rim is held on the felly of the wheel by means of clips or lugs which are ordinarily employed for firmly clamping the ordinary rims on the wheel.

From the foregoing description, it will be seen that I have provided a rim which can be easily attached to or detached from an automobile or truck tire, one, which although constructed of sections, will be as rigid and solid as a one-piece rim, and one which can be manufactured with economy as the same only constitutes six parts, four of which being of pressed steel, and none of which are of a complicated design. The three sections constituting the rim are practically duplicates and can be made by the same machine.

My improved rim does not require a special felly but can be readily applied to the fellies now employed on automobile wheels.

Having thus described the invention, what is claimed as new, is:—

1. A collapsible rim for pneumatic tires constructed of three similar sections of equal length and thickness throughout, certain of said sections having sockets at the ends thereof, two of said sections having integrally formed hooks designed to coengage with the walls of the sockets of the confronting sections, one of said sections having a removable hook engaging in the socket of the confronting section, interengaging means between said hook and the rim section on which it is arranged, and locking means on said rim section for said hook.

2. A collapsible rim for pneumatic tires made up of three segmental sections of equal length, width and thickness throughout, two of said sections having sockets therein, the socket of one of the sections being located adjacent to one of the ends of the said section, the sockets of the other section being arranged adjacent to both ends of the said section, all of the sockets being provided by forming the sections with openings therethrough, and plates on the under face of the sections partly closing said openings, integrally formed hooks extending from the ends of two of the sections received in and coengaging with the walls of the sockets of the adjacent section, one of the remaining sections having its end notched and provided with lugs partly closing the notch at the ends of the said notch, a removable hook disposed to be arranged upon said section and coengaging with the walls of the socket of the confronting section, said hook having a transverse bar designed to be received in the referred to notch and having lateral lugs inward of the bar designed to coengage with the referred to lugs on the said rim section, said hook having an extension providing a lever the end of which being arranged at an inclination, and a pivoted locking member on the referred to section having a beveled active end designed to be arranged over the inclined end of the lever to lock the same on the section.

In testimony whereof I affix my signature.

LESLIE G. ROLLER.